United States Patent
Nozaki (10) Patent No.: US 12,377,533 B2
(45) Date of Patent: Aug. 5, 2025

(54) CONTROL SYSTEM, CONTROL METHOD, AND STORAGE MEDIUM

(71) Applicants: KEIO UNIVERSITY, Tokyo (JP); Motion Lib, Inc., Kawasakai (JP)

(72) Inventor: Takahiro Nozaki, Kanagawa (JP)

(73) Assignees: KEIO UNIVERSITY, Tokyo (JP); Motion Lib, Inc., Kawasakai (JP)

( * ) Notice: Subject to any disclaimer, the term of this patent is extended or adjusted under 35 U.S.C. 154(b) by 83 days.

(21) Appl. No.: 18/014,116

(22) PCT Filed: Jun. 25, 2021

(86) PCT No.: PCT/JP2021/024049
§ 371 (c)(1),
(2) Date: Dec. 30, 2022

(87) PCT Pub. No.: WO2022/004568
PCT Pub. Date: Jan. 6, 2022

(65) Prior Publication Data
US 2023/0264342 A1 Aug. 24, 2023

(30) Foreign Application Priority Data
Jun. 30, 2020 (JP) ................................. 2020-113633

(51) Int. Cl.
*B25J 3/04* (2006.01)
*B25J 13/02* (2006.01)

(52) U.S. Cl.
CPC ........ *B25J 3/04* (2013.01); *B25J 13/02* (2013.01)

(58) Field of Classification Search
CPC ............. B25J 3/04; B25J 13/02; B25J 9/1689
See application file for complete search history.

(56) References Cited

U.S. PATENT DOCUMENTS

| | | |
|---|---|---|
| 2005/0001575 A1 | 1/2005 | Furuta et al. |
| 2007/0112466 A1 | 5/2007 | Ohnishi et al. |

(Continued)

FOREIGN PATENT DOCUMENTS

| | | |
|---|---|---|
| JP | S62124886 A | 6/1987 |
| JP | S62297080 A | 12/1987 |

(Continued)

OTHER PUBLICATIONS

International Search Report (ISR) (and English translation thereof) dated Sep. 7, 2021, issued in International Application No. PCT/JP2021/024049.

(Continued)

*Primary Examiner* — Harry Y Oh
(74) *Attorney, Agent, or Firm* — Holtz, Holtz & Volek PC (57) ABSTRACT

A control system includes a master device, a slave device, and a control device that controls the master device and the slave device. In the control device, a response value acquisition unit acquires data of physical quantities representing action of the movable portion of the master device, and data of physical quantities representing action of the movable portion of the slave device. A command value calculation unit hypothesizes a virtual object that includes the master device and the slave device, and calculates a command value for causing the master device and the slave device to follow behavior expressed in the virtual object by input to the master device and the slave device, on the basis of the data of physical quantities acquired by the response value acquisition unit.

11 Claims, 7 Drawing Sheets

(56) References Cited

U.S. PATENT DOCUMENTS

| | | | |
|---|---|---|---|
| 2012/0191245 A1* | 7/2012 | Fudaba | B25J 3/04 |
| | | | 700/254 |
| 2018/0250086 A1* | 9/2018 | Grubbs | A61B 34/35 |
| 2021/0031358 A1* | 2/2021 | Sakaino | B25J 3/00 |
| 2021/0060762 A1* | 3/2021 | Hongo | B25J 3/02 |

FOREIGN PATENT DOCUMENTS

| | | |
|---|---|---|
| JP | H0741560 B2 | 5/1995 |
| JP | 2003145457 A | 5/2003 |
| JP | 2009279699 A | 12/2009 |
| JP | 2017071012 A | 4/2017 |
| WO | 2005109139 A1 | 11/2005 |

OTHER PUBLICATIONS

Written Opinion dated Sep. 7, 2021, issued in International Application No. PCT/JP2021/024049.

Yokokohji, et al., "Bilateral Control of Master-Slave Manipulators for Ideal Kinesthetic Coupling", SICE Journal of Control, Measurement, and System Integration, vol. 27, No. 1, pp. 56-63, 1991.

* cited by examiner

CONTROL SYSTEM, CONTROL METHOD, AND STORAGE MEDIUM

TECHNICAL FIELD

The present invention relates to a control system for controlling actions of a robot or the like, a control method, and a storage medium.

BACKGROUND ART

In recent years, there is demand for robot control technology to realize safe contact with humans and the environment, in order to realize a wide variety of work by robots.

Particularly, in order to flexibly handle indeterminate elements, such as position and size or objects, variance in hardness, and so forth, regarding which modeling is difficult, realization of adaptive adjustment of mechanical impedance and compliant actions is indispensable.

Note that PTL 1, for example, describes technology relating to a robot performing compliance control, as technology for controlling actions of a robot.

CITATION LIST

Patent Literature

PTL 1: Japanese Unexamined Patent Application Publication No. 2003-145457

SUMMARY OF INVENTION

Technical Problem

As one method for realizing adaptive physical interaction of robots, robot control technology applying a master-slave system is being used. Various techniques are being proposed as robot control technology applying master-slave systems, such as reproducing mechanical impedance of ambient environment, improving robot operability, and so forth, between master and slave.

However, reproducibility of mechanical impedance of ambient environments, and operability, have not been sufficiently high in robots using conventional technology.

Accordingly, realization of suitable physical interaction of robots has been difficult in conventional technology.

A control system according to an aspect of the present invention comprising:
 a first device that accepts input for operation;
 a second device that performs an action with respect to an object; and
 a control device that controls the second device in accordance with the operation input to the first device, and also executes control to transfer reactive force that the second device receives from the object to the first device, wherein
 the control device includes
 a data acquisition means for acquiring data of a physical quantity that represents an action of a movable portion of the first device and data of a physical quantity that represents an action of a movable portion of the second device, and
 a command value calculation means for hypothesizing a virtual object that includes the first device and the second device, and calculating a command value for causing the first device and the second device to following behavior expressed in the virtual object by input to the first device and the second device, on the basis of the data of the physical quantity acquired by the data acquisition means.

DESCRIPTION OF EMBODIMENTS

An embodiment of the present invention will be described below with reference to the drawings.

First, a basic principle applied to the present invention be described.

[Basic Principle]

Figure 1:
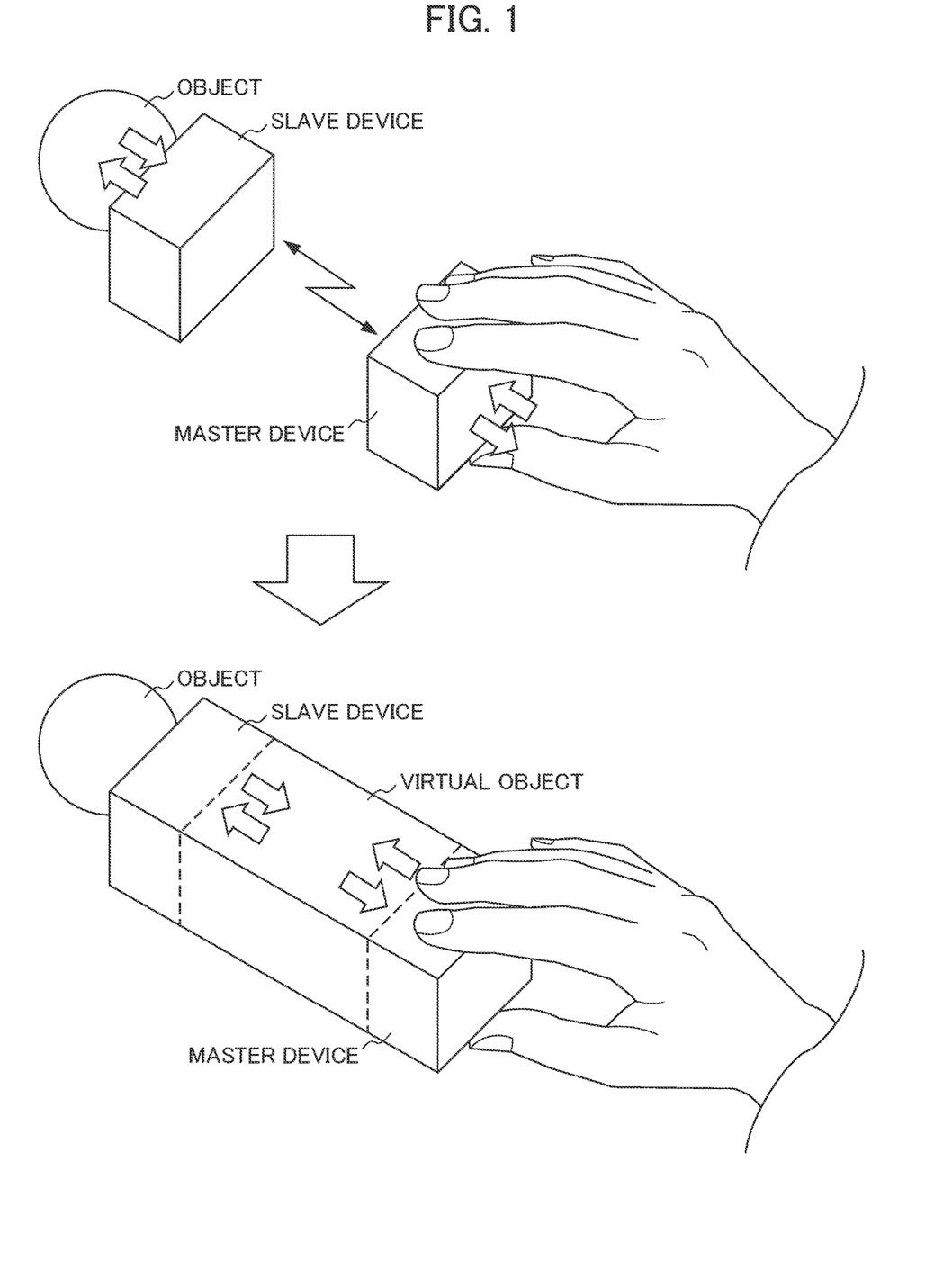
FIG. 1 is a schematic diagram illustrating a concept of the present invention.

FIG. 1 is a schematic diagram illustrating a concept of the present invention.

As illustrated in FIG. 1, a virtual object is assumed in the present invention that includes a master device and a slave device in a robot to which a master-slave system is applied, and control is performed in which actions of the master device and the slave device are caused to follow behavior of the virtual object in a case in which input to the maser device and the slave device is taken as input to the virtual object. At this time, force response input from the master device and the slave device is multiplied by admittance, a parameter representing velocity is calculated, and this is given to a position control system of the master device and the slave device, as a velocity command value, along with the current velocity.

Accordingly, performance equal to or exceeding that of conventional reproducibility and operability can be obtained as the reproducibility and operability of actions at the master device and the slave device.

Thus, more suitable physical interaction of robots can be realized.

Also, in the present invention, control can be performed on the basis of a velocity command value, and accordingly affinity with existing position (or velocity) control systems (systems that do not assume velocity control) is high. Note however, that control based on acceleration command values can be performed with the present invention as well.

Note that position and velocity (or acceleration), or angle and angular velocity (or angular acceleration) are parameters that are replaceable by calculus operation, and accordingly in a case of performing processing relating to position or angle, replacement with velocity, angular velocity, or the like, can be performed as appropriate.

[Configuration]

Next, a system configuration of the present invention will be described.

Figure 2:
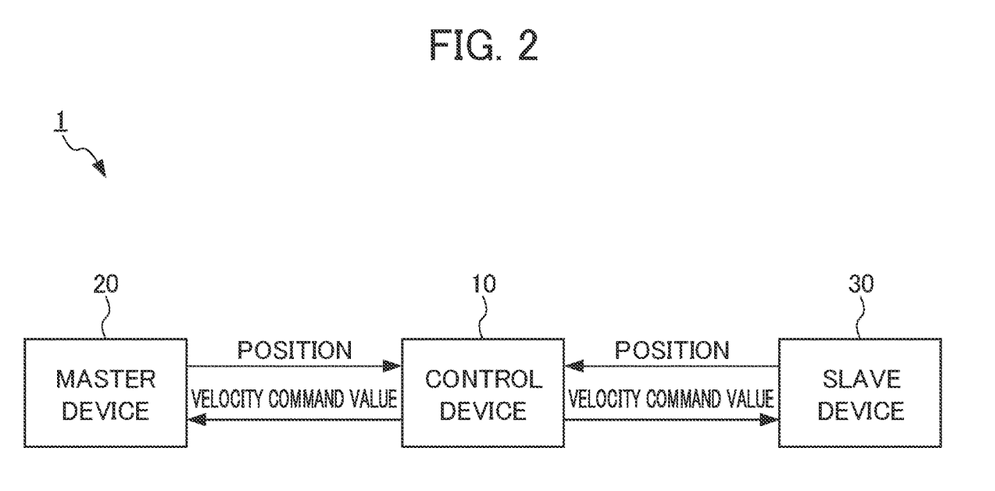
FIG. 2 is a schematic diagram illustrating an overall configuration of a control system 1 according to an embodiment of the present invention.

FIG. 2 is a schematic diagram illustrating an overall configuration of a control system 1 according to an embodiment of the present invention.

As illustrated in FIG. 2, the control system 1 according to the present embodiment includes a control device 10, a master device 20, and a slave device 30. The control device 10, the master device 20, and the slave device 30 are connected by wired communication or wireless communication through a public network such as the Internet, a dedicated line, direct connection through communication cables, or the like.

The control device 10 is made up of an information processing device including a processor and memory, such as a PC (Personal Computer), a programmable controller, or the like, and calculates command values of velocity (or position) at each of the master device 20 and the slave device 30, on the basis of physical quantities acquired at the master device 20 and the slave device 30 (which herein is positions of movable portions of the master device 20 and the slave device 30). The control device 10 then transmits the command values of the calculated velocity (or position) to the master device 20 and the slave device 30.

At this time, the control device 10 assumes a virtual object including the master device 20 and the slave device 30, and calculates command values of velocity (or position) for the master device 20 and the slave device 30 to follow the behavior of the virtual object, in a case of taking input to the master device 20 and the slave device 30 as input to the virtual object.

The master device 20 accepts input for operating the slave device 30, and also outputs reactive force with respect to the input. Specifically, the master device 20 acquires physical quantities (position herein) of a movable portion that is changed by input for operating the slave device 30, and transmits the physical quantities to the control device 10. Also, the master device 20 controls an actuator on the basis of a velocity command value (or position command value) transmitted from the control device 10, and causes velocity of the movable portion to follow a target velocity (or target position) of the movable portion.

The slave device 30 performs output with respect to the environment (object) in response to operation by the master device 20, and also receives input of reactive force from the environment in response to output. Specifically, on the basis of a velocity command value (or position command value) transmitted from the control device 10, the slave device 30 controls an actuator so that the velocity of the movable portion follows the target velocity (or target position). The slave device 30 also acquires physical quantities (position herein) of the movable portion that received reactive force from the environment, and transmits the physical quantities to the control device 10.

[Specific Configuration]

Next, a specific configuration of the control system 1 will be described.

Figure 3:
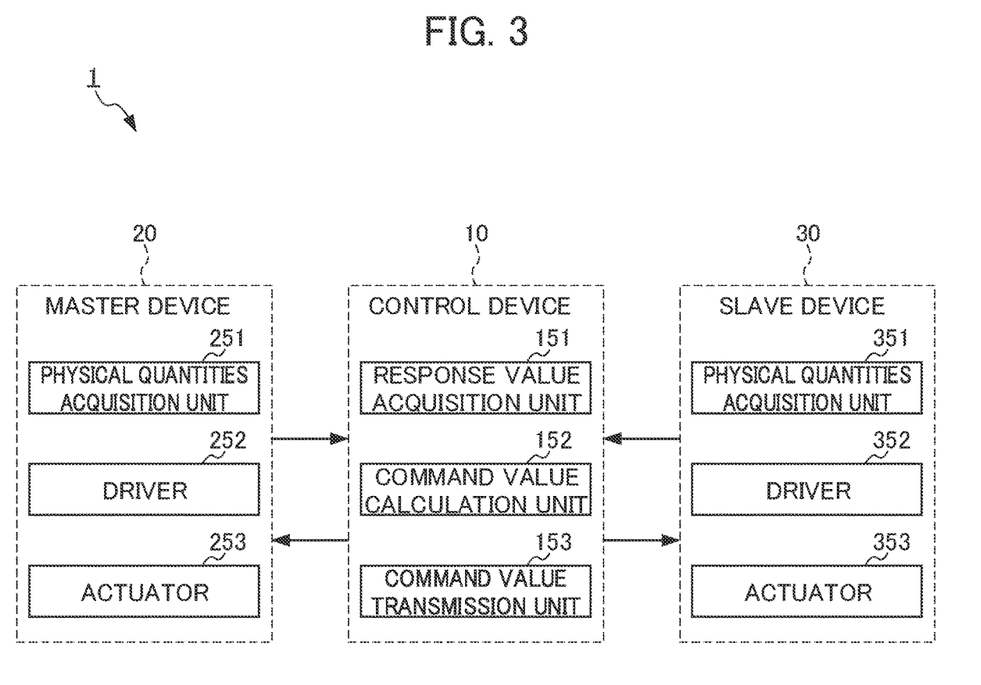
FIG. 3 is a block diagram illustrating a specific configuration example of the control system 1.

FIG. 3 is a block diagram illustrating a specific configuration example of the control system 1.

As illustrated in FIG. 3, the control device 10 includes a response value acquisition unit 151, a command value calculation unit 132, and a command value transmission unit 153.

The response value acquisition unit 151 acquires physical quantities acquired at the master device 20 and the slave device 30 (which herein is positions of movable portions of the master device 20 and the slave device 30).

The command value calculation unit 152 calculates velocity command values (or position command values) to cause the master device 20 and the slave device 30 to follow the behavior of the virtual object (virtual object having mass m) hypothesized to include the master device 20 and the slave device 30, on the basis of the physical quantities of the master device 20 and the slave device 30 acquired by the response value acquisition unit 151. Specifically, the command value calculation unit 152 calculates a velocity command value with respect to the master device 20 and calculates a velocity command value with respect to the slave device 30, following Expressions (1) and (2) below, for example.

[Math. 1]

$$V_1^{ref} C_v \{Y(F_1+F_2)-V_1\}+Y(F_1+F_2) \tag{1}$$

$$V_2^{ref} C_v \{Y(F_1+F_2)-V_2\}+Y(F_1+F_2) \tag{2}$$

Note that in Expressions (1) and (2), $V_1^{ref}$ represents the velocity command value for the master device 20, $V_2^{ref}$ represents the velocity command value for the slave device 30, $C_v$ represents a velocity controller, Y represents admittance, $F_1$ represents a force response value of the master device, $F_2$ represents a force response value of the slave device 30, $V_1$ represents velocity of the movable portion of the master device 20, and $V_2$ represents velocity of movable portion of the slave device 30.

Note that $F_1$ and $F_2$ can be acquired from the physical quantities (positions herein) acquired from the master device 20 and the slave device 30, using various types of force estimation techniques (converting into acceleration and estimating as a multiplication value with mass, or estimating by an observer, or the like). Also, $V_1$ and $V_2$ can be acquired by differentiation of physical quantities (positions herein) acquired from the master device 20 and the slave device 30. Note that the control device 10 may acquire force as the physical quantities from the master device 20 and the slave device 30, and use the force for computing Expressions (1) and (2).

Also, although Expressions are shown in Expressions (1) and (2) regarding a case of calculating velocity command values, position command values can be calculated and the master device 20 and the slave device 30 can be controlled by the position command values. Also, acceleration command values (e.g., see Expressions (3) and (4) described later) can be calculated and the master device 20 and the slave device 30 can be controlled by the acceleration command values. Further, current command values or voltage command values for actuators can be calculated, and the master device 20 and the slave device 30 can be controlled by the current command values or the voltage command values for, the actuators.

The command value transmission unit 153 transmits the command value (velocity command value herein) for the master device 20 and the command value (velocity command value herein) for the slave device 30, which are calculated by the command value calculation unit 152, to the master device 20 and the slave device 30.

Also, as illustrated in FIG. 3, the master device 20 includes a physical quantities acquisition unit 251, a driver 252, and an actuator 253.

The physical quantities acquisition unit 251 includes a position sensor for detecting the position of a movable portion of the master device 20 (e.g., an output shaft of the actuator 253), and transmits the position of the movable portion detected by the position sensor to the control device 10. Note that, in addition to the position sensor, the physical quantities acquisition unit 251 may include a force sensor that detects force that the movable portion of the master device 20 is subjected to, and transmit the force that the movable portion is subjected to, detected by the force sensor, to the control device 10. Also, instead of the position sensor, the physical quantities acquisition unit 251 may include a velocity sensor (or acceleration sensor) that detects the velocity (or acceleration) of the movable portion of the master device 20 (e.g., the output shaft of the actuator 253), and transmit the velocity (or acceleration) of the movable portion detected by the velocity sensor (or acceleration sensor) to the control device 10.

The driver 252 outputs a drive current (or drive voltage) corresponding to the command value for the master device 20, which is transmitted from the control device 10, to the actuator 253.

The actuator 253 outputs reactive force in accordance with the drive current (or drive voltage) input from the driver 252, with respect to operation input to the master device 20.

Also, as illustrated in FIG. 3, the slave device 30 includes a physical quantities acquisition unit 351, a driver 352, and an actuator 353.

The physical quantities acquisition unit 351 includes a position sensor, that detects the position of the movable portion of the slave device 30 (e.g., an output shaft of the actuator 353), and transmits the position of the movable portion detected by the position sensor to the control device 10. Note that, in addition to the position sensor, the physical quantities acquisition unit 351 may include a force sensor that detects force that the movable portion of the slave device 30 is subjected to, and transmit the force that the movable portion is subjected to, detected by the force sensor, to the control device 10. Also, instead of the position sensor, the physical quantities acquisition unit 351 may include a velocity sensor (or acceleration sensor) that detects the velocity (or acceleration) of the movable portion of the slave device 30 (e.g., the output shaft of the actuator 353), and may transmit the velocity (or acceleration) of the movable portion detected by the velocity sensor (or acceleration sensor) t the control device 10.

The driver 352 outputs a drive current (or drive voltage) corresponding to the command value for the slave device 30, which transmitted from the control device 10, to the actuator 353.

The actuator 353 outputs force to the environment (object) in accordance with the drive current (or drive voltage) input from the driver 352.

[Actions]

Next, actions of the control system 1 will be described.

[Velocity Control Processing]

Figure 4:
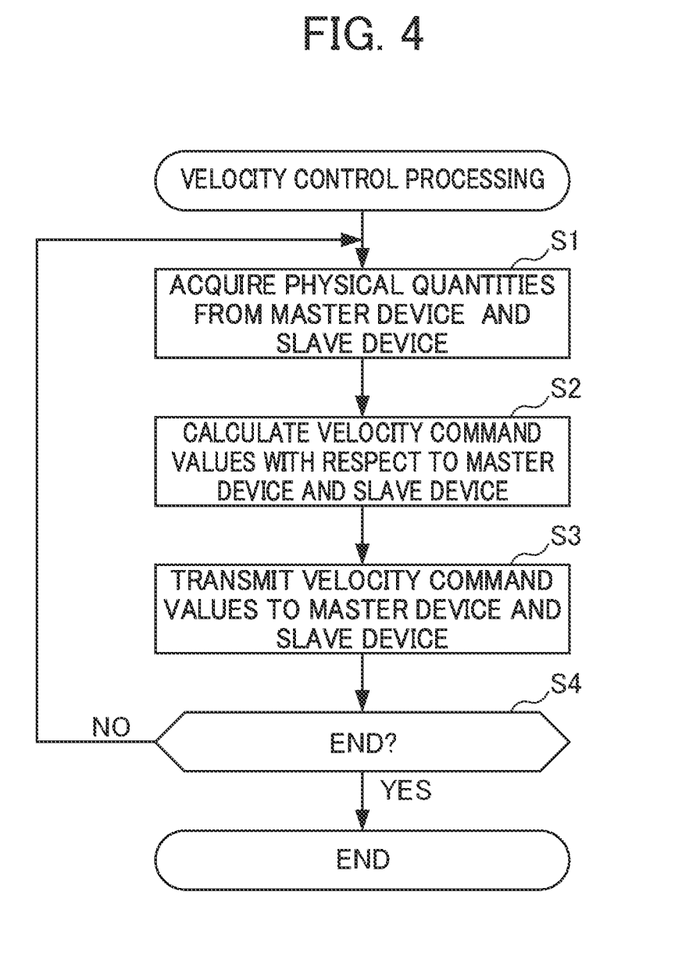
FIG. 4 is a flowchart for describing a flow of velocity control processing that the control system 1 executes.

FIG. 4 is a flowchart for describing a flow of velocity control processing that the control system 1 executes.

The velocity control processing is started in accordance with execution of the velocity control processing being commanded at the control device 10.

In step S1, the response value acquisition unit 151 of the control device 10 acquires physical quantities from the master device 20 and the slave device 30. Specifically, in step S1, the response value acquisition unit 151 acquires the position of the movable portion from the physical quantities acquisition unit 251 of the master device 20 and the physical quantities acquisition unit 351 of the slave device 30. Note that at this time, the response value acquisition unit 151 may acquire the velocity or acceleration of the movable portion, or the force that the movable portion is subjected to, from the physical quantities acquisition unit 251 of the master device 20 and the physical quantities acquisition unit 351 of the slave device 30.

In step S2, the command value calculation unit 152 of the control device 10 calculates toe velocity command values with respect to the master device 20 and the slave device 30. Specifically, the command value calculation unit 152 calculates a velocity command value with respect to the master device 20 and calculates a velocity command value with respect to the slave device 30, following Expressions (1) and (2). Note that at this time, position command values can be calculated, and the position command values can be used to control the master device 20 and the slave device 30. Also, at this time, acceleration command values can be calculated, and the acceleration command values can be used to control the master device 20 and the slave device 30.

In step S3, the command value transmission unit 153 of the control device 10 transmits the velocity command value of the master device 20 and the velocity command value of the slave device 30 that are calculated by the command value calculation unit 152, to the master device 20 and the slave device 30. Thus, bilateral control is realized at the master device 20 and the slave device 30.

In step S4, the command value calculation unit 152 of the control device 10 performed determination of whether ending of the velocity control processing is commanded or not.

In a case in which ending of the velocity control processing is not commanded, a determination of NO is made in step S4, and the processing returns to step S1.

On the other hand, in a case in which ending of the velocity control processing is commanded, a determination of YES is made in step S4, and the velocity control processing ends.

According to such processing, performance equal to or exceeding that of conventional reproducibility and operability can be obtained as the reproducibility and operability of actions of the master device 20 and the slave device 30.

Accordingly, more suitable physical interaction of robots can be realized.

Also, in a case of controlling the master device 20 and the slave device 30 by the above-described control, parameters necessary for control can be reduced, and accordingly the amount of data transmitted and received among devices can be reduced.

[Verification of Effects]

Next, verification results of comparing control performance of the above-described control system 1 and a conventional technique will be described.

For comparison with a conventional technique, transforming the above-described Expressions (1) and (2) into acceleration command values yields the representation in the following Expressions (3) and (4).

[Math. 2]

$$s^2 X_1^{ref} = C_p \left\{ \frac{Y}{s}(F_1 + F_2) - X_1 \right\} + Y(F_1 + F_2)s \quad (3)$$

$$s^2 X_2^{ref} = C_p \left\{ \frac{Y}{s}(F_1 + F_2) - X_2 \right\} + Y(F_1 + F_2)s \quad (4)$$

Note that in Expressions (3) and (4), s represents a Laplacian operator, $X_1^{ref}$ represents a position command value to the master device 20 (i.e., $s^2 X_1^{ref}$ represents a command value of acceleration to the master device 20), $X_2^{ref}$ represents a velocity command value to the slave device 30 (i.e., $s^2 X_2^{ref}$ represents is command value of acceleration to the slave device 30), $C_p$ represents a position controller, Y represents admittance, $F_1$ represents a force response value of the master device, $F_2$ represents a force response value of the slave device 30, $X_1$ represents the position of the movable portion of the master device 20, and $X_2$ represents the positon of the movable portion of the slave device 30.

In intuitive robot operations, transmission of mechanical impedance is important. Transmission of mechanical impedance can be expressed using a two-port network by analogy with an electrical system. ABCD parameters in a two-port network are as shown in Expression 5.

[Math. 3]

$$\begin{bmatrix} F_1 \\ V_1 \end{bmatrix} = \begin{bmatrix} A & B \\ C & D \end{bmatrix} \begin{bmatrix} F_2 \\ -V_2 \end{bmatrix} \quad (5)$$

is given.

With the mechanical impedance of the contact environment as $Z_2$, the relation between velocity $V_2$ and force $F_2$ at the slave device 30 is $$F_2 = -Z_2 V_2 \quad (6)$$

Expressions (5) and (6) yield the following Expression (7).

[Math. 4]

$$F_1 = \frac{A}{CZ_2 + D} Z_2 V_1 + \frac{B}{CZ_2 + D} V_1 \quad (7)$$

Now, the coefficient $V_1$ in the first term of the right side is an index indicating the degree of reproduction of mechanical impedance in the environment, and is called reproducibility Pr. Also, the coefficient $V_1$ in the second term of the right side is an index indicating the degree of force generated when operating, and is called operability Po. $F_1$ can be expressed as in Expression (8) by using these.

$$F_1 = (P_r Z_2 + P_o) V_2 \quad (8)$$

In order to reproduce mechanical impedance in the environment that the slave device 30 is in contact with at the master device 20 at which the operator inputs operations, there is need for $$F_1 = Z_2 V_1 \quad (9)$$

to hold.

One ideal set of ABCD parameters that realizes this can be expressed as in the following Expression (10).

[Math. 5]

$$\begin{bmatrix} A & B \\ C & D \end{bmatrix} = \begin{bmatrix} -1 & 0 \\ 0 & -1 \end{bmatrix} \quad (10)$$

The reproducibility Pr and operability Po at this time assume ideal values, which are $$Pr = 1 \quad (11)$$

$$Po = 0 \quad (12)$$

In the above-described control system 1, a virtual object that is in contact with both the master device 20 and the slave device 30 is assumed, and the control device 10 performs control to cause the master device 20 and the slave device 30 perform actions to follow the behavior of this virtual object.

At this time, if Expressions (3) and (4) are given to an ideal acceleration control system.

$$s^2 X^{ref} = s^2 X^{res} \quad (13)$$

holds.

Accordingly, the ABCD parameters are found as in the following Expression (14).

[Math. 6]

$$\begin{bmatrix} F_1 \\ V_1 \end{bmatrix} = \begin{bmatrix} -1 & -\frac{1}{Y} \\ 0 & -1 \end{bmatrix} \begin{bmatrix} F_2 \\ -V_2 \end{bmatrix} \quad (14)$$

Also, reproducibility Pr and operability Po are $$Pr = 1 \quad (15)$$

$$Po = 1/Y \quad (16)$$

Conversely, in the conventional technique (acceleration-based bilateral control), acceleration command values are expressed as in the following Expressions (17) and (18).

[Math. 7]

$$s^2 X_1^{ref} = C_p(X_2 - X_1) + C_f(F_1 + F_2) \quad (17)$$

$$s^2 X_2^{ref} = C_p(X_1 - X_2) + C_f(F_1 + F_2) \quad (18)$$

Now, assuming an ideal acceleration control system, and assuming that Expression (1) holds, the ABCD parameters in the conventional technique are found as in the following expression (19).

[Math. 8]

$$\begin{bmatrix} F_1 \\ V_1 \end{bmatrix} = \begin{bmatrix} -1 & -\frac{s}{C_f} \\ 0 & -1 \end{bmatrix} \begin{bmatrix} F_2 \\ -V_2 \end{bmatrix} \quad (19)$$

Also, with regard to reproducibility Pr and operability Po, $$Pr = 1 \quad (20)$$

$$Po = s/C_f \quad (21)$$

hold, where $C_f$ represents a force controller.

[Comparison of Operability]

In comparison of the present invention with the conventional technique regarding operability, in a case of admittance Y in the present invention being only from inertia My, this is expressed as $$Y = 1/M_y s \quad (22)$$

On the other hand, assuming the force controller $C_f$ in the conventional technique to be a proportional controller for gain $K_f$, it can be seen from $$1/K_f = M_y \quad (23)$$

that the same operability can be obtained with the present invention and the conventional technique.

[Comparison of Effects of Minor Loop]

Next, the effects of minor loops will be compared between the present invention and the conventional technique.

Comparison will be performed here assuming an industrial manipulator that is currently in widespread use. A PIP positional controller is assumed as the minor loop, in order to simulate an industrial manipulator based on conventional positional control. At this time, a transfer function from an acceleration command value to an acceleration response value is found as in the following Expression (24).

[Math. 9]
$$s^2 X^{res} = \frac{C_{PID}}{Ms^2 + C_{PID}} s^2 X^{ref} \qquad (24)$$

Here, $C_{PID}$ represents a PID controller, and M represents motor inertia, respectively. Assuming Expression (23) for comparison, it can be seen that operability according to the conventional technique is expressed as in the following Expression (25).

[Math. 10]
$$P_o = \frac{MM_Y s^3}{C_{PID}} + M_Y s \qquad (25)$$

On the other hand, it can be seen that operability of the present invention is expressed as in the following Expression (26).

[Math. 11]
$$P_o = \frac{s^2}{s^2 + C_{PID}} \frac{MM_Y s^3}{C_{PID}} + M_Y s \qquad (26)$$

Accordingly, it can be seen from the first term of the right side that operability of the present invention is superior in the lower region.

[Modification 1]

Although an example of actually connecting and controlling the master device 20 and the slave device 30 is described in the above embodiment, this is not restrictive That is to say, one or both of the master device 20 and the slave device 30 may be configured as a device that is virtual (model of a virtual device that executes various types of actions in virtual space), in which the control device 10 controls the master device 20 and the slave device 30. Also, in this case, the device that is virtual may execute a particular action model (model of an action of drawing a circle, model of acting in accordance with a particular routine, etc.), in which the control device 10 performs control to cause the master device 20 or the slave device 30 to follow the behavior of a virtual object corresponding to the particular action model.

Thus, the above control can be performed following actions of a virtual master-slave system in a standalone device. Also, the master device 20 or the slave device 30 can be controlled in accordance with actions of the device that is virtual executing the particular action model.

[Modification 2]

In the above embodiment, the force, position, velocity, or the like, which is processed at the control system 1, can be enlarged or reduced (scaled).

For example, when the control device 10 perform control, scaling of physical quantities (position, force, etc.) input to the virtual object, and scaling of command values to the master device 20 or command values to the slave device 30 can be performed. Also, actions of the master device 20 or the slave device 30 can be scaled by increasing or decreasing the drive current (or drive voltage) that the driver 252 of the master device 20 or the driver 352 of the slave device 30 outputs.

Accordingly, minute actions or massive actions can be converted into a magnitude that humans can readily sense.

[Modification 3]

In the above embodiment, control parameters (velocity command values, acquired physical quantities, etc.) can be recorded while actions are being performed in the control system 1. Also, recorded actions can be reproduced by reading out the control parameters that are recorded, and controlling the master device 20 and the slave device 30 following these control parameters.

Accordingly, actions performed the past can be saved, and particular actions can be repeatedly executed.

[Modification 4]

In the above embodiment, physical properties of objects can be measured by analyzing control parameters while actions are being performed in the control system 1.

For example, inertia, viscosity, elasticity, and so forth, of objects can be calculated from response values from objects that are detected, with respect to input performed for operation.

Accordingly, physical properties of objects can be comprehended by the control system 1 coming into contact with the objects, without using special measurement equipment.

[Modification 5]

Although the virtual object including the master device 20 and the slave device 30 is assumed to have mass in (inertia) in the above embodiment, this is not restrictive, and the virtual object can be assumed to have various types of physical properties that objects have, such as viscosity, elasticity (rigidity), and so forth, and not mass m (inertia) alone.

Figure 5:
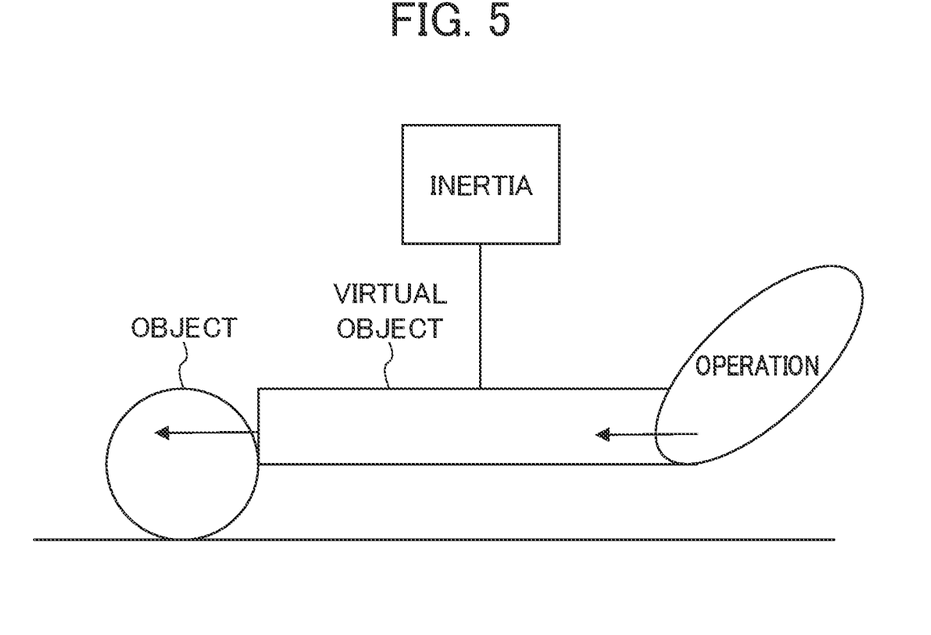
FIG. 5 is a schematic diagram illustrating a state of assuming mass m (inertia) in the virtual object.
Figure 6:
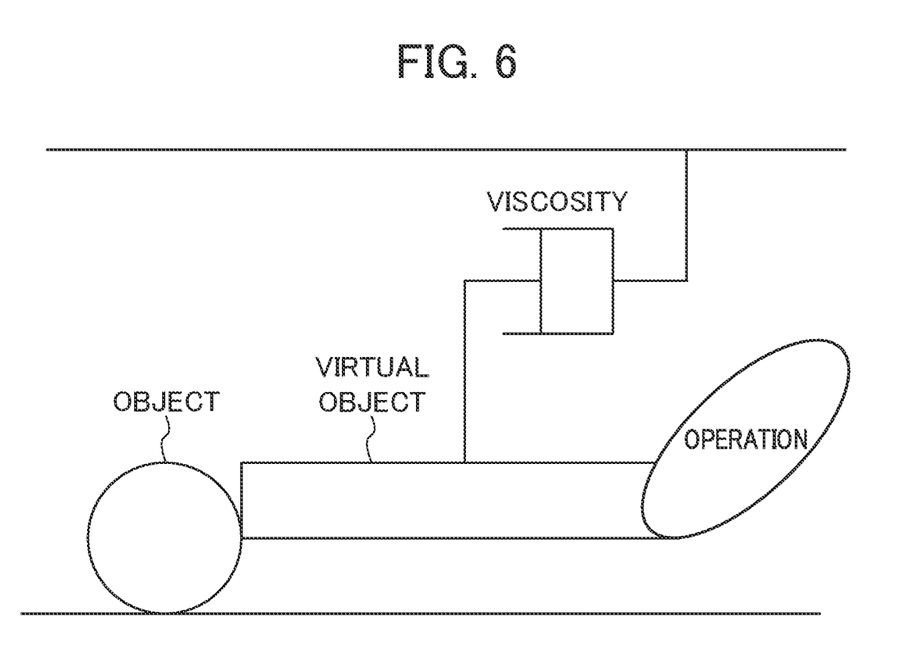
FIG. 6 is a schematic diagram illustrating a state of assuming viscosity modulus D (viscosity) in the virtual object.

FIG. 5 is a schematic diagram illustrating a state of assuming mass m (inertia) in the virtual object. Also, FIG. 6 is a schematic diagram illustrating a state of assuming viscosity modulus D (viscosity) in the virtual object. Also, FIG. 7 is a schematic diagram illustrating a state of assuming elasticity modulus K (elasticity) in the virtual object.

Figure 7:
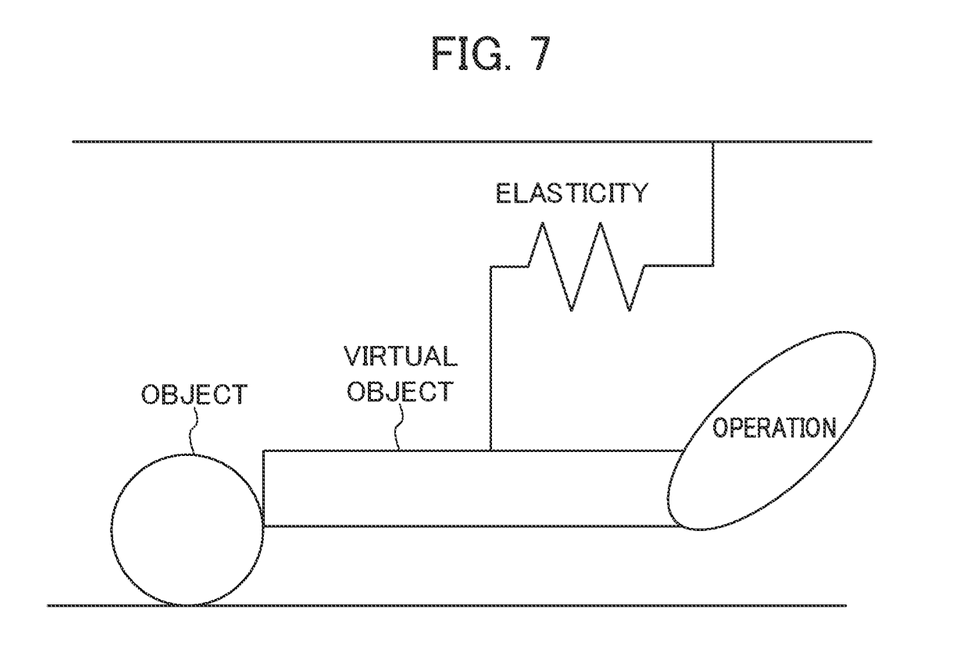
FIG. 7 is a schematic diagram illustrating a state of assuming elasticity modulus K (elasticity) in the virtual object.

As illustrated in FIG. 5 to FIG. 7, inertia, viscosity, and elasticity can be assumed for the virtual object. Also, the inertia, viscosity, and elasticity of the virtual object can be assumed independently or in combination. The following Expression (27) can be set as the admittance Y or the virtual object, in a case of assuming inertia, viscosity, and elasticity of the virtual object.

$$Y = 1/(ms + D + K(1/s)) \qquad (27)$$

Also, in this case, the relation of force f and velocity v acting on the virtual object (i.e., the master device 20 and the slave device 30) is expressed as in the following Expression (28).

$$v = Yf = f/(ms + D + K(1/s)) \qquad (28)$$

Inertia set to the virtual object represents the difficulty of the virtual object to accelerate. In a case of performing transfer of sharp force between the master device 20 and the slave device 30, the inertia is preferably set to be minimal.

Also, viscosity set to the virtual object represents, in addition to the operation force input to the master device 20 and the reactive force from the environment (object) input to the slave device 30, application of a third force due to setting the admittance Y. The viscosity set to the virtual object has an effect of suppressing instability in operation force, and so forth.

Further, elasticity set to the virtual object represents a property of the virtual object deformed by the applied force to return to the original state. Setting elasticity to the virtual object enables control of moving the virtual object to a particular position, or the like.

Thus, the master device 20 and the slave device 30 can be controlled in various action forms, by changing the physical properties assumed for the virtual object.

As described above, the control system 1 according to the present embodiment includes the control device 10, the master device 20, and the slave device 30.

The master device 20 accepts input for operation

The slave device 30 perform actions with respect to the object.

The control device 10 controls the slave device 30 in accordance with the operation input to the master device 20, and also executes control of transferring reactive force that the slave device 30 receives from the object to the master device 20.

The control device 10 includes the response value acquisition unit 151, the command value calculation unit 152, and the command value transmission unit 153.

The response value acquisition unit 151 acquires data of physical quantities representing action of the movable portion of the master device 20, and data of physical quantities representing action of the movable portion of the slave device 30.

The command value calculation unit 152 hypothesizes the virtual object that includes the master device 20 and the slave device 30, and calculates a command value for causing the master device 20 and the slave device 30 to follow the behavior expressed in the virtual object by input to the master device 20 and the slave device 30, on the basis of the data of physical quantities acquired by the response value acquisition unit 151.

Accordingly, due to employing the control method in which the virtual object is followed, performance equal to or exceeding that of conventional reproducibility and operability can be obtained as the reproducibility and operability of actions of the master device 20 and the slave device 30.

Accordingly, more suitable physical interaction of robots can be realized.

The command value calculation unit 152 calculates command values for the master device 20 and the slave device 30 on the basis of a difference between at least one of velocity, position, and acceleration, of the virtual object, obtained by multiplying, force input to the master device 20 and the slave device 30 by a multiplication element for conversion of force into at least one of velocity, position, and acceleration, and at least one of the velocity, position, and acceleration of the master device 20 or the slave device 30.

Accordingly, highly-precise bilateral control can be executed by acquiring force input to the virtual object from the master device 20 and the slave device 30, and at least one of the velocity, position, and acceleration of the master device 20 and the slave device 30.

The command value calculation unit 152 calculates command values for the master device 20 and the slave device 30 on the basis of a difference between at least one of velocity, position, and acceleration, of the virtual object, obtained by multiplying force input to the master device 20 and the slave device 30 by admittance, and at least one of the velocity, position, and acceleration of the master device 20 or the slave device 30.

Accordingly, highly-precise bilateral control can be executed by converting force into velocity or position as appropriate.

The command value calculation unit 152 calculates command values by adding a feed-forward component based on force input from the master device 20 and the slave device 30.

Accordingly, the master device 20 and the slave device 30 can be made to follow the behavior of the virtual object with even higher precision.

At least one of the master device 20 and the slave device 30 is configured as a device that is virtual.

The command value calculation unit 152 calculates command values for causing the master device 20 and the slave device 30 to follow the behavior of the virtual object that is based on the actions of this device that is virtual.

Accordingly, control of causing actions to follow the behavior of the virtual object, following actions of a virtual master-slave system, can be performed in a standalone device.

At least one of the master device 20 and the slave device 30 is configured as a device that is virtual, which executes a particular action model.

The command value calculation unit 152 calculates command values for causing the master device 20 and the slave device 30 to follow the behavior of the virtual object, which is based on the particular action model.

Accordingly, the master device 20 or the slave device 30 can be controlled in accordance with actions of the device that is virtual, which executes the particular action model.

In the output of at least one of the master device 20 and the slave device 30, scaling is performed in which at least one of force, position, and velocity is enlarged or reduced.

Accordingly, minute actions or massive actions can be converted into a magnitude that humans can readily sense.

Parameters relating to control of at least one of the master device 20 and the slave device 30 are recorded in time sequence.

Accordingly, actions performed in the past can be saved.

Actions are reproduced by reading out parameters relating to control of at least one of the master device 20 and the slave device 30 that are recorded, in time sequence, and controlling the master device 20 or the slave device 30 on the basis of the parameters.

Accordingly, actions performed in the past can be reproduced, and particular actions can be repeatedly executed.

Information relating to physical properties of objects is acquired on the basis of parameters relating to control of at least one of the master device 20 and the slave device 30.

Accordingly, physical properties of objects can be comprehended by the control system 1 coming into contact with the objects, without using special measurement equipment.

The present invention is not to be limited to the above-described embodiment. Various changes, modifications, etc. are also covered by the present invention as long as such changes, modifications, etc. fall in a range in which the object of the present invention can be achieved.

For example, in the above embodiment, $Y(F_1+F_2)$ is added as the second term of the right side in Expressions (1) and (2). Conversely, velocity command values may be calculated without adding the second term of the right side in Expressions (1) and (2). That is to say, the second term of the right side in Expressions (1) and (2) is a feed-forward term for further improving the control precision, and accordingly the velocity command values can be calculated without adding the second term of the right side in Expressions (1) and (2), depending on the control precision required by the control system 1. Note that the same holds true for the second term $(F_1+F_2)$s of the right side in Expressions (3) and (4).

Also, an example is described in the above embodiment in which in Expressions (1) and (2), force response values of the master device 20 and the slave device 30 are multiplied by admittance Y to calculate velocity, but this is not restrictive. That is to say, command values for velocity or position can be calculated by multiplying the force response values of the master device 20 and the slave device 30 by various types of multiplication elements for conversion of force into velocity or position. The various types of multiplication elements for conversion of force into velocity or position can be a fixed value, or otherwise can be a matrix, a function, or the like, regarding which the content thereof (conversion properties of converting force into velocity or position) can be designed.

Also, an example is described in the above embodiment in which the master device 20 and the slave device 30 are controlled by command values of the same type (e.g., velocity command values), but this is not restrictive. That is to say, the types of command values given to the master device 20 and the slave device 30 may be different from each other.

In the same way, an example is described in the above embodiment in which the master device 20 and the slave device 30 acquire physical quantities of the same type (e.g., position of movable portion), but this is not restrictive. That is to say, the types of physical quantities acquired by the master device 20 and the slave device 30 may be different from each other.

Also, an example is described in the above embodiment in which the control device 10 that controls the master device 20 and the slave device 30 is included, but this is not restrictive. That is to say, a control device 10 that controls the master device 20 and a control device 10 that controls the slave device 30 may each be provided.

Also, embodiments can be made by combining the above embodiment and the modifications and so forth.

The process in the embodiment and the like may be performed through hardware or software.

That is, any configuration may be employed as long as a function for performing the process described above is provided for the control system 1. The functional configuration and the hardware configuration for realizing the function are not limited to the examples described above.

When the process described above is performed through software, programs constituting the software are installed from a network or a storage medium to a computer.

The storage medium that stores the program is constituted by, for example, a removable medium that is distributed separately from the device body, or a storage medium that is previously built in the device body. The removable medium is constituted by, for example, a semiconductor memory, a magnetic disk, an optical disc, or a magneto-optical disk. The optical disc is constituted by, for example, a CD-ROM (Compact Disk-Read Only Memory), a DVD (Digital Versatile Disk), or a Blu-ray Disc (trademark). The magneto-optical disk is constituted by, for example, a MID (Mini-Disk). The storage medium that is previously built in the device body is constituted by, for example, ROM, a hard disk or a semiconductor memory in which the program is stored.

The above embodiment is an example to which the present invention is applied, and does not limit the technical scope of the present invention. That is, the present invention may be subjected to various modifications such as omission and replacement without deviating from the spirit of thereof, and various embodiments other than that described above may be implemented. Various embodiments and modifications thereof that can be implemented in the present invention are included in the scope of the invention described in the claims and an equivalent scope.

REFERENCE SIGNS LIST 1 control system, 10 control device, 20 master device, 30 slave device, 151 response value acquisition unit, 152 command value calculation unit, 153 command value transmission unit, 251,351 physical quantities acquisition unit, 252,352 driver, 253,353 actuator

The invention claimed is:

1. A control system, comprising:
a master device that accepts input for operation;
a slave device that performs an action with respect to an object; and
a control device that controls the slave device in accordance with the operation input to the master device, and also executes control to transfer a reactive force that the slave device receives from the object to the master device,
wherein the control device includes a hardware processor which, under control of a stored program, executes processes comprising:
a data acquisition process including acquiring data of a position or velocity that represents an action of a movable portion of the master device and data of a position or velocity that represents an action of a movable portion of the slave device, and
a command value calculation process including hypothesizing a virtual object that includes the master device and the slave device, and calculating a command value for causing the master device and the slave device to follow behavior expressed in the virtual object by input to the master device and the slave device, based on the basis of the data of the position or velocity acquired in the data acquisition process, and
wherein the command value calculation process comprises estimating a force acting on the master device and the slave device based on the data of the position or velocity, including a change in position due to external force and a change in position not due to external force, and calculating the command value for causing the master device and the slave device to follow a behavior occurring in the virtual object due to the force estimated to act on the master device and the slave device, based on (i) the data of the position or velocity including the change in position due to external force and the change in position not due to external force, (ii) the force estimated to act on the master device and the slave device, and (iii) an admittance that is set to determine an inertia, a viscosity, and an elasticity of the virtual object.

2. The control system according to claim 1, wherein the command value calculation process comprises calculating the command value for the master device or the slave device based on a difference between (i) at least one of a velocity, a position, and an acceleration of the virtual object, the at least one of the velocity, the position, and the acceleration of the virtual object being obtained by multiplying the force estimated to act on the master device and the slave device by the admittance, and (ii) at least one of the velocity, the position, and the acceleration of the master device or the slave device.

3. The control system according to claim 1, wherein the command value calculation process comprises calculating the command value by adding a feed-forward component based on the force estimated to act on the master device and the slave device.

4. The control system according to claim 1, wherein at least one of the master device and the slave device is configured as a virtual device, and
wherein the command value calculation process comprises calculating the command value for causing the master device and the slave device to follow a behavior of the virtual object that is a behavior based on an action of the virtual device.

5. The control system according to claim 1, wherein at least one of the master device and the slave device is configured as a virtual device that is virtual, which executes a particular action model, and
wherein the command value calculation process comprises calculating the command value for causing the master device and the slave device to follow a behavior of the virtual object, which is object that is a behavior based on the particular action model.

6. The control system according to claim 1, wherein, in an output of at least one of the master device and the slave device, scaling is performed in which at least one of a force, a position, and a velocity is enlarged or reduced.

7. The control system according to claim 1, wherein a parameter relating to control of at least one of the master device and the slave device is recorded in time sequence.

8. The control system according to claim 1, wherein an action is reproduced by reading out a parameter relating to control of at least one of the master device and the slave device that is recorded, in time sequence, and controlling the master device or the slave device based on the parameter.

9. The control system according to claim 1, wherein information relating to a physical property of the object is acquired based on a parameter relating to control of at least one of the master device and the slave device.

10. A control method executed by a control device of a control system including a master device that accepts input for operation and a slave device that performs an action with respect to an object, the control device controlling the slave device in accordance with the operation input to the master device and also executing control to transfer of a reactive force that the slave device receives from the object to the master device, and the control method comprising:
acquiring data of a position or velocity that represents an action of a movable portion of the master device and data of a position or velocity that represents an action of a movable portion of the slave device; and
calculating a command value, the calculating the command value including hypothesizing a virtual object that includes the master device and the slave device, and calculating a command value for causing the master device and the slave device to follow behavior expressed in the virtual object by input to the master device and the slave device, based on the data of the position or velocity acquired in the acquiring,
wherein the calculating the command value comprises estimating a force acting on the master device and the slave device based on the data of the position or velocity, including a change in position due to external force and a change in position not due to external force, and calculating the command value for causing the master device and the slave device to follow a behavior occurring in the virtual object due to the force estimated to act on the master device and the slave device, based on (i) the data of the position or velocity including the change in position due to external force and the change in position not due to external force, (ii) the force estimated to act on the master device and the slave device, and (iii) an admittance that is set to determine an inertia, a viscosity, and an elasticity of the virtual object.

11. A non-transitory storage medium storing a computer-readable program executable by a computer of a control device, the control device being provided in a control system including a master device that accepts input for operation and a slave device that performs an action with respect to an object, the control device controlling the slave device in accordance with the operation input to the master device and also executing control to transfer of a reactive force that the slave device receives from the object to the master device, and the program being executable by the computer to control the computer to execute processes comprising:
a data acquisition process including acquiring data of a position or velocity that represents an action of a movable portion of the master device and data of a position or velocity that represents an action of a movable portion of the slave device; and
a command value calculation process including hypothesizing a virtual object that includes the master device and the slave device, and calculating a command value for causing the master device and the slave device to follow behavior expressed in the virtual object by input to the master device and the slave device, based on the basis of data of the position or velocity acquired in the data acquisition process,
wherein the command value calculation process comprises estimating a force acting on the master device and the slave device based on the data of the position or velocity, including a change in position due to external force and a change in position not due to external force, and calculating the command value for causing the master device and the slave device to follow a behavior occurring in the virtual object due to the force estimated to act on the master device and the slave device, based on (i) the basis of data of the position or velocity including the change in position due to external force and the change in position not due to external force, (ii) the force estimated to act on the master device and the slave device, and (iii) an admittance that is set to determine an inertia, a viscosity, and an elasticity of the virtual object.

* * * * *

UNITED STATES PATENT AND TRADEMARK OFFICE
CERTIFICATE OF CORRECTION

PATENT NO. : 12,377,533 B2
APPLICATION NO. : 18/014116
DATED : August 5, 2025
INVENTOR(S) : Nozaki It is certified that error appears in the above-identified patent and that said Letters Patent is hereby corrected as shown below:

On the Title Page

In item (71) change "Kawasakai (JP)" to --Kawasaki (JP)--.

In item (73) change "Kawasakai (JP)" to --Kawasaki (JP)--.

In the Claims

Column 14, Line 36, Claim 1 change "on the basis of" to --on--.

Column 15, Line 15, Claim 5 change "device that is virtual" to --device--.

Column 15, Line 20, Claim 5 change "virtual object, which is" to --virtual--.

Column 16, Line 38, Claim 11 change "basis of data" to --data--.

Column 16, Line 49, Claim 11 change "basis of data" to --data--.

Signed and Sealed this
Tenth Day of February, 2026

John A. Squires
*Director of the United States Patent and Trademark Office*